United States Patent [19]
Valdevit

[11] Patent Number: 5,636,345
[45] Date of Patent: Jun. 3, 1997

[54] METHOD AND APPARATUS FOR DETECTING AND PREVENTING BROADCAST STORMS ON AN EMULATED LOCAL AREA NETWORK

[75] Inventor: Ezio Valdevit, San Jose, Calif.

[73] Assignee: Bay Networks, Inc., Santa Clara, Calif.

[21] Appl. No.: 414,903

[22] Filed: Mar. 30, 1995

[51] Int. Cl.⁶ .................................................. G06F 15/16
[52] U.S. Cl. ........................... 395/200.11; 395/182.02; 370/232; 370/253
[58] Field of Search .................. 395/200.11, 200.06, 395/200.13, 182.02; 370/94.1, 13

[56] References Cited

U.S. PATENT DOCUMENTS

| | | | |
|---|---|---|---|
| 5,341,363 | 8/1994 | Hirasawa | 370/13 |
| 5,539,659 | 7/1996 | McKee et al. | 364/514 B |
| 5,557,747 | 9/1996 | Rogers et al. | 395/200.11 |
| 5,557,748 | 9/1996 | Norris | 395/200.1 |

*Primary Examiner*—Glenn A. Auve
*Attorney, Agent, or Firm*—Blakely, Sokoloff, Taylor & Zafman

[57] ABSTRACT

A method and apparatus for detecting broadcast storms in an emulated Local Area Network are provided. The broadcast rates of the nodes in the emulated Local Area Network are monitored during monitoring periods. The broadcast rate for a node is the rate at which a LAN emulation server receives broadcast messages from the node during a monitoring period. Each of the broadcast rates is compared with a maximum allowed broadcast rate. If any of the broadcast rates exceeds the maximum allowed broadcast rate, then it is determined that a broadcast storm is occurring. Once it is determined that a broadcast storm is occurring, various countermeasures can be taken. For example, a warning indication may be generated, messages from the node that is causing the broadcast storm may be ignored until the broadcast storm stops, or the node that is causing the broadcast storm may be removed from the emulated Local Area Network. Each node may have its own maximum allowed broadcast rate and its own countermeasure policy, or a single rate and policy may apply to an entire emulated Local Area Network or to an entire set of emulated Local Area Networks.

29 Claims, 6 Drawing Sheets

METHOD AND APPARATUS FOR DETECTING AND PREVENTING BROADCAST STORMS ON AN EMULATED LOCAL AREA NETWORK

FIELD OF THE INVENTION

The present invention relates to Asynchronous Transfer Mode network systems, and more specifically, to a method and apparatus for protecting an emulated Local Area Network based on an Asynchronous Transfer Mode network from excessive traffic caused by broadcast storms.

BACKGROUND OF THE INVENTION

A Local Area Network (LAN) typically consists of a number of stations, computers and peripherals that are connected together via a cabled network in order to exchange data. The manner in which the exchange of data takes place depends on the network access protocol used by the LAN. At present, the most common network access protocols include token passing, carrier sense-multiple access with collision detection (CSMA/CD) and Asynchronous Transfer Mode (ATM).

In the token passing protocol, an individual entity on the network can transmit data packets only when a packet containing a "token" is received. Each station is allotted a limited amount of time before giving up the token to the next station. This provides for "determinism" in that if the maximum number of stations on a given network is known, then it is possible to calculate the maximum delay between the last transmit and the next transmit period for a given station.

According to the CSMA/CD protocol, each station listens to determine whether the network trunk is busy, and then transmits as soon as the "busy" indication goes away. If a collision is detected, a timer set with a random seed is started. When the timer counts down to zero, the station is allowed to transmit again if the line is not busy. If another collision is detected, the timer is set to a larger value. This process continues, with the timer increasing exponentially with each collision, until the station gets access and the problem is resolved.

When information is placed on the network trunk, the information is visible to all stations on the network. Each station on the network reads a header portion of each message to determine whether the station is an intended recipient of the message. The intended recipient of the message reads and processes the message.

Because all of the stations in a CSMA/CD network receive each message anyway, it is as efficient to deliver a message designated for all stations on a network as it is to deliver a message designated for a single station. Messages designated for all stations on a network are referred to as broadcast messages. A broadcast message is sent in the same manner of any other message, but rather than designate an individual destination node, the message contains a broadcast indication. All of the nodes on the network read and process broadcast messages.

For certain situations, the ability to broadcast messages is extremely useful. However, support for broadcast messages also makes CSMA/CD networks more vulnerable to malfunctions. For example, if a node on a CSMA/CD network has a malfunction that causes the node to continuously transmit broadcast messages, then the efficiency of all of the nodes on the network is adversely affected. Specifically, every node on the network is forced to devote processing resources to continuously read and process the constant flow of spurious broadcast messages. This type of network problem is referred to as a broadcast storm.

According to ATM protocol, cells or frames consisting of cells of information are transmitted from a source node to a destination node through a "connection." A connection consists of a pathway through a digital network. A digital network is constructed of digital switches coupled together by digital communication lines. Each cell originates at a source node and is transmitted across the communications lines. The communication lines carry the cells of information between the digital switches along the connection pathway. Prior to communicating with another entity over an ATM network, an entity must first cause the digital switches to establish a pathway between itself and the intended recipient of the message. Once the connection is established, the entity transmits cells that contain the message onto communication lines that connect the entity with the digital network. The digital switches route the cells from incoming communication lines to outgoing communication lines and finally to the destination node.

ATM does not directly support broadcast messages. To emulate the broadcast function provided by CSMA/CD networks, LAN emulation servers have been developed. ALAN emulation server is an agent that runs on a node of the ATM network. To emulate broadcast messages, connections are established between the node containing the LAN emulation server and all of the nodes that are to receive the broadcast messages. The nodes that will receive the broadcast messages are collectively referred to as a "emulated LAN". To "broadcast" a message, an entity on the emulated LAN transmits the message over the ATM connection to the LAN emulation server. The LAN emulation server receives the message and retransmits the message on the connections established between the LAN emulation server and the members of the emulated LAN.

As explained above, LAN emulation servers combine the functionality of broadcast messaging with the increased throughput provided by ATM technology. However, with the benefits of broadcast messaging comes the problem of broadcast storms. For example, one of the nodes on an emulated LAN may constantly transmit broadcast messages to a LAN emulation server due to a malfunction or misconfiguration. The efficiency of the LAN emulation server would be diminished as it attempts to process all of the messages from the malfunctioning node. Further, the LAN emulation server processes the broadcast messages by retransmitting them on the various connections between it and the members of the emulated LAN. This flood of messages may consume a large amount of the capacity of the digital network, slowing all network communications. Further, all of the nodes on the emulated LAN will have to continuously receive and process the messages generated by the LAN emulation server.

In light of the foregoing, it is clearly desirable to provide an apparatus and method for detecting and protecting against broadcast storms. It is further desirable to provide a method and apparatus that allows selection between various broadcast storm handling procedures. It is further desirable to provide a broadcast storm detection system that allows a user to designate what conditions constitute broadcast storms.

SUMMARY OF THE INVENTION

A method and apparatus for detecting broadcast storms in an emulated Local Area Network are provided. According to the method, the broadcast rates of each of the nodes in the emulated Local Area Network are determined. Each broadcast rate reflects the rate at which a node in the emulated Local Area Network transmitted broadcast messages during a monitoring period. Each of the broadcast rates is compared with a maximum allowed broadcast rate. If any of the broadcast rates exceeds the maximum allowed broadcast rate, with which it is compared, then it is determined that a broadcast storm is occurring. Once it is determined that a broadcast storm is occurring, various countermeasures can be taken. For example, a warning indication may be generated, messages from the node that is causing the broadcast storm may be ignored until the broadcast storm stops, or the node that is causing the broadcast storm may be removed from the emulated Local Area Network.

The apparatus includes a LAN emulation server for use in a computer system. The LAN emulation server includes a message detection unit, a message retransmission unit, a rate computation unit, a rate violation detection unit and a rate violation handling unit. The message detection unit detects the arrival of messages from any of the nodes that belong to the emulated Local Area Network. The message retransmission unit retransmits to all of the nodes all messages received from any of the nodes. The rate computation unit detects the rates at which messages arrive from each of the nodes during a monitoring period. The rate violation detection unit determines when any of the rates exceeds a maximum allowed broadcast rate. The rate violation handling unit executes countermeasures in response to detecting that any of the rates exceeds the maximum allowed broadcast rate.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for protecting against broadcast storms on an emulated Local Area Network is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
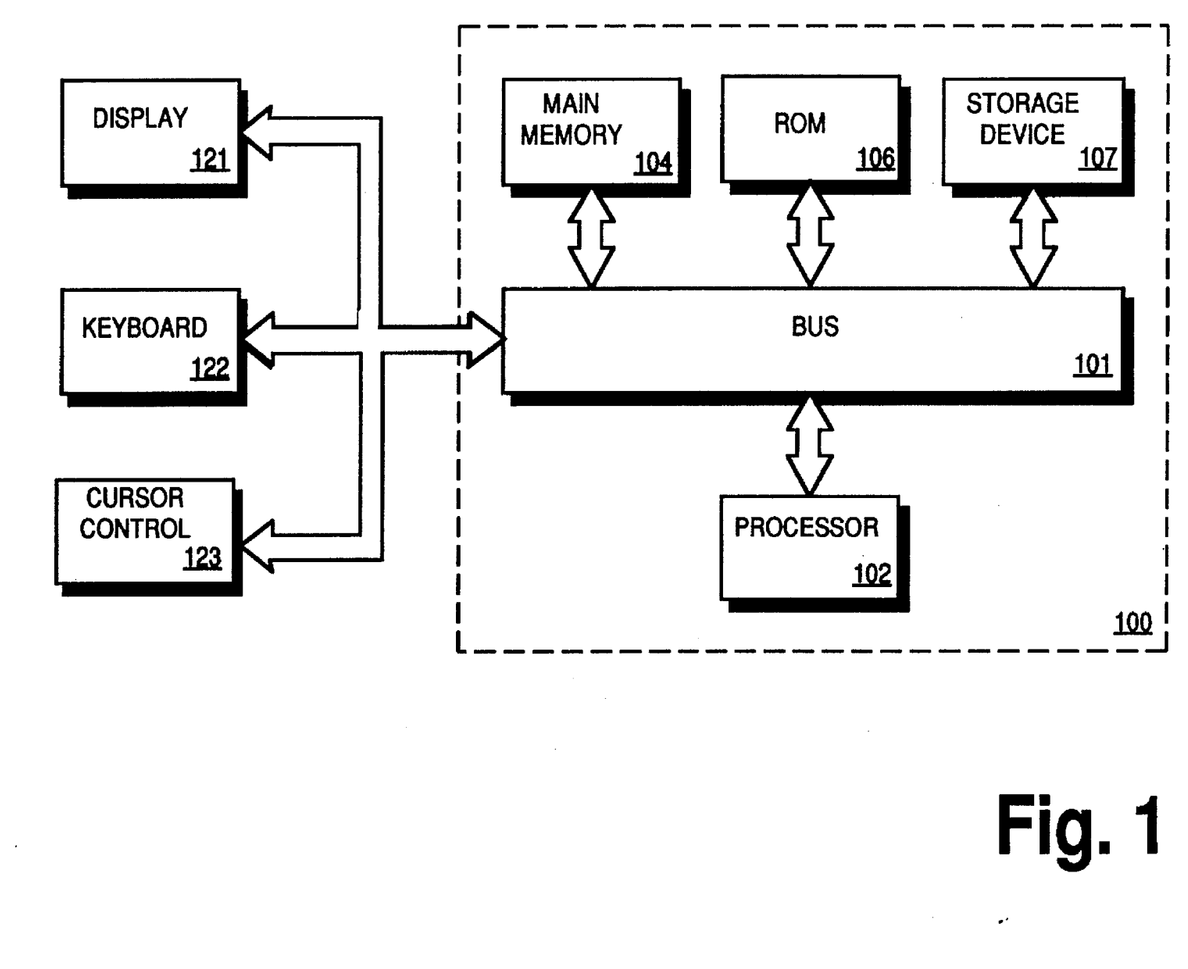
FIG. 1 illustrates a computer system upon which the present invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

Furthermore, a data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

EXEMPLARY EMULATED LAN

Figure 2:
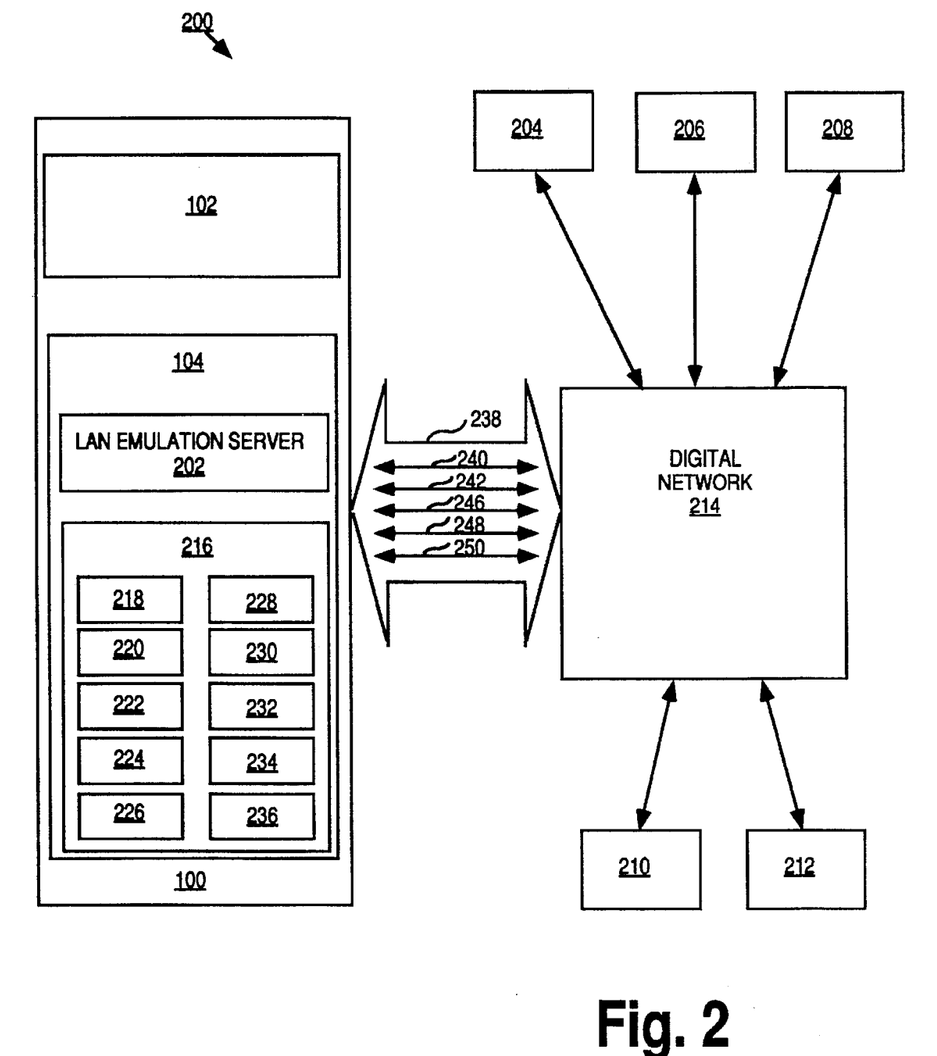
FIG. 2 is a block diagram that illustrates an ATM network system that includes a node executing a LAN emulation server configured according to an embodiment of the present invention.

Referring to FIG. 2, it illustrates computer system 100 as a node in an ATM network 200. In addition to computer system 100, ATM network 200 includes a plurality of other nodes 204, 206, 208, 210 and 212 connected to a digital network 214. Nodes 204, 206, 208, 210 and 212 may be any type of network device, such as a computer work station, printer, bridge or router.

Digital network 214 generally represents one or more ATM switches through which pathways are formed to allow the nodes connected to digital network 214 to communicate with each other. As explained above, ATM protocol allows a single physical line to carry data for multiple logical connections. For example, line 238 in FIG. 2 represents a single physical line that connects computer system 100 to digital network 214, while connections 240, 242, 246, 248 and 250 represent distinct logical connections that are carried over line 238.

In the exemplary network 200 illustrated in FIG. 2, nodes 204, 206, 208, 210 and 212 belong to an emulated LAN. Computer system 100 includes a LAN emulation server 202 stored in memory 104. Processor 102 reads instructions from LAN emulation server 202 and executes the instructions to establish the emulated LAN. Specifically, execution of the instructions contained in LAN emulation server 202 causes computer system 100 to establish a connection through digital network 214 with each of the nodes that is to participate in the emulated LAN.

In the illustrated example, five nodes will participate in the emulated LAN. Therefore, execution of LAN emulation server 202 causes computer system 100 to establish five connections through digital network 214. Specifically, connection 240 represents the connection between computer system 100 and node 204, connection 242 represents the connection between computer system 100 and node 206, and connection 246 represents the connection between computer system 100 and node 208. In addition, connection 248 represents the connection between computer system 100 and node 210, and connection 250 represents the connection between computer system 100 and node 212.

When any of the nodes in the emulated LAN desire to broadcast a message to all of the other nodes in the emulated LAN, the node transmits the message through digital network 214 to computer system 100. LAN emulation server 202 detects the arrival of the message and retransmits the message over each of connections 240–250 through digital network 214 to each of the nodes that belong to the emulated LAN.

For example, to broadcast a message, node 204 transmits a broadcast message to computer system 100 through digital network 214 over connection 240. Computer system 100, pursuant to the execution of instructions contained in LAN emulation server 202 retransmits the message back through digital network 214 over each of connections 240–250. Consequently, nodes 204, 206, 208, 210 and 212 receive the message over connections 240, 242, 246, 248, and 250, respectively.

Connections 240-250, which are directed from LAN emulation server 202 to nodes 204, 206, 208,210 and 212, can be replaced by a single ATM point-to-multipoint connection. An ATM point-to-multipoint connection is a unidirectional connection that allows a single copy of a message, sent by LAN emulation server 202, to be received by each nodes 204, 206, 208, 210 and 212.

By supporting the broadcast of messages over emulated LANs, as described above, the execution of LAN emulation server 202 renders network 200 susceptible to broadcast storms. For example, if, due to a malfunction, node 204 continuously transmits broadcast messages to computer system 100 over connection 240, computer system 100 is forced to dedicate a relatively large percentage of its processing capacity simply to handle the constant flow of information over connection 240. Further, the retransmission of the messages back through digital network 214 to all of the nodes in the emulated LAN would generate a large amount of traffic through digital network 214. The congestion thus produced in digital network 214 could slow down other inter-device communication. Further, when the broadcast message is finally arrived at the various nodes in the emulated LAN, each of the nodes will have to expend processing resources to read and process the constant flood of messages.

Rate Monitoring

To detect and prevent the degradation process described above, LAN emulation server 202 includes instructions which cause computer system 100 to monitor the rate at which each node of the emulated LAN is transmitting broadcast messages. If computer system 100 detects that a particular node is transmitting broadcast messages at a rate that exceeds a predetermined threshold, computer system 100 assumes that the node that is transmitting the broadcast messages is malfunctioning. Upon detection of a malfunctioning node, computer system 100 initiates measures to notify a user of the malfunction and/or isolate the emulated LAN from the malfunctioning node.

According to one embodiment of the invention, computer system 100 keeps track of the broadcast rate of each of the nodes in the emulated LAN through the use of a count value table 216 stored in memory 104. The count value table 216 includes two counters for each of the nodes in the emulated LAN. In the illustrated example, counters 218 and 228 correspond to node 204, counters 220 and 230 correspond to node 206, and counters 222 and 232 correspond to node 208. In addition, counters 224 and 234 correspond to node 210 and counters 226 and 236 correspond to node 212.

At any given point in time, one of the two counters that correspond to a node is a current counter, while the other counter for that node is an old counter. The current counter for a node stores a current count value for the node. The old counter for a node stores an old count value for the node. Initially, before any broadcast messages are received, computer system 100 initializes count value table 216 so that for each node in the emulated LAN, the current count value is equal to the old count value. This may be accomplished, for example, by setting all of the count values to zero.

When computer system 100 receives a broadcast message from a particular node, instructions contained in LAN emulation server 202 cause computer system 100 to increment the current count value associated with that particular node. After a predetermined period of time, computer system 100 determines the difference between the current count value and the old count value for each of the nodes in the emulated LAN. The difference between the current count value and the old count value is then divided by a value which represents the duration of the monitoring period to yield a value that indicates the rate at which broadcast messages were received from each of the nodes in the emulated LAN.

For example, execution of LAN emulation server 202 may initially cause computer system 100 to set all of the count values in count value table 216 to zero. Computer system 100 may then provide broadcasting services to the emulated LAN for a thirty second monitoring period. It shall be assumed that counters 218, 220, 222, 224, and 226 contain the current count values for nodes 204, 206, 208, 210 and 212 respectively. Conversely, counters 228, 230, 232, 234 and 236 contain the old count values for nodes 204, 206, 208, 210 and 212, respectively. For each broadcast that comes in during the first thirty second period, computer system 100 will increment the current count value that corresponds to the node which sent the broadcast message. For example, for each broadcast message sent by node 204 during the first thirty second period, computer system 100 will increment the count value stored in counter 218. Similarly, for each broadcast message received from node 210 during the thirty second period, computer system 100 will increment the count value stored in counter 224.

At the end of the thirty second period, computer system 100 subtracts the old count value from the current count value for each of the nodes in the emulated LAN. Thus, if node 204 transmitted sixty broadcast messages during the thirty second period, the difference between the count value in counter 218 and the count value in counter 228 would be sixty. This difference value is then divided by the duration of the monitoring period (i.e. thirty seconds) to determine the average rate at which each of the nodes in the emulated LAN had transmitted broadcast messages during the monitoring period. In the present example, if node 204 had transmitted sixty broadcast messages during the first thirty second period, the broadcast rate that computer system 100 would determine for node 204 would be two broadcast messages per second.

After determining the rate at which each of the nodes in the emulated LAN is broadcasting messages, computer system 100 compares the calculated rates to a predetermined threshold value. The threshold value represents a maximum allowed broadcast rate. If a node exceeds the threshold rate, it is considered to be in a malfunctioning state.

As soon as the first monitoring period has ended, computer system 100 begins counting the messages sent by each of the nodes on the emulated LAN during a second thirty second period. However, prior to incrementing any of the current count values during the second monitoring period, computer system 100 sets the old count values equal to the current count values. Thus, at the beginning of the second monitoring period, the old count value in counter 228 that corresponds to node 204 would be set equal to current count value in counter 218. At the end of the second thirty second monitoring period, computer system 100 once again determines the rate at which broadcast messages were sent by each of the nodes in the emulated LAN. Each of these rates is compared against a threshold rate that indicates a maximum allowed broadcast rate.

Computer system 100 continuously performs the broadcast rate detection process for all of the nodes in the emulated LAN as described above, until any of the nodes in the emulated LAN exceeds the maximum allowed broadcast rate. Once computer system 100 detects that a node in the emulated LAN has exceeded the maximum allowed broadcast rate, computer system 100 takes measures to warn a user of the problem and/or to protect network 200 from the detrimental effects of a broadcast storm.

In an alternative embodiment, the old count value is replaced with a time value. According to this embodiment, the current count value and the time value for each connection are initially set to zero. When the first message for a connection comes in, the current count value is incremented and the time value is set to the current time. When subsequent messages come in on the connection, the current count value is incremented and the original time value is subtracted from the current time value.

If the difference between the original time value and the current time value is larger than a predetermined amount (K1), then both the current count value and the time value are reset to 0. On the other hand, if the difference between the original time value and the current time value is smaller than the predetermined amount (K1), then the message counter is checked. If the message counter is higher than another predetermined amount (K2), then computer system 100 determines that a broadcast storm is occurring and initiates counter measures.

The embodiment that uses an old count value is preferred to the time value embodiment in that it requires the rate to be calculated less frequently. However, the old count value embodiment may not be feasible in systems that do not provide a readily available timer service.

According to another embodiment of the invention, computer system 100 may measure broadcast rates in terms of the amount of information (e.g. the number of bytes of data) sent during a monitoring period rather than the number of messages that are sent during the monitoring period. According to this embodiment, each time a message arrives, the current count value is incremented by a value that reflects the size of the incoming message. Consequently, both the size of messages and the number of messages are taken into account. Thus, a single large message would count as much as numerous small messages. Presently, the embodiment that determines rate based on the number of messages per monitoring period is preferred because the processing resources used by LAN emulation server 202 are largely dictated by the number of messages it has to process, and less affected by the size of messages.

Counter Measures

The specific countermeasures performed by computer system 100 in response to detecting a broadcast storm will vary from implementation to implementation. For example, in one embodiment computer system 100 may simply generate a warning message on display 121. The warning message may indicate, for example, the identity of the node that has exceeded the specified maximum allowed broadcast rate, and an indication of the actual rate at which the problem node is broadcasting messages. The warning message could be displayed also on a device different from display 121. For example, the warning message may be displayed on a remote Network Management Station. Meanwhile, computer system 100 would continue to monitor and retransmit the messages from the problem node. Optionally, computer system 100 may be configured to periodically retransmit the warning indication for as long as the broadcast storm condition exists. If the broadcast rate of the problem node falls below the maximum allowed broadcast rate, computer system 100 automatically ceases to generate the warning indication.

According to an alternative embodiment, LAN emulation server 202 contains instructions to cause computer system 100 to cease the retransmission of messages from a node that exceeds the maximum allowed broadcast rate. Preferably, this is performed in addition to the generation of a warning message. Thus, if node 204 exceeds the maximum allowed broadcast rate during any given monitoring period, computer system 100 generates a warning message and does not retransmit any broadcast messages sent by node 204 during the subsequent monitoring period. However, computer system 100 would continue to monitor the rate at which node 204 was sending broadcast messages. If, during any subsequent monitoring period, the broadcast rate of node 204 falls below the maximum allowed broadcast rate, computer system 100 will begin again to retransmit the broadcast messages it receives from node 204.

The second method for handling broadcast storms has an advantage over the mere generation of a warning message in that it eliminates the network traffic caused by the retransmission of the messages sent by the malfunctioning node. As a result, digital network 214 will become less congested, and the other nodes in the emulated LAN will not have to expend processing time to process a flood of messages sent by the malfunctioning node. However, computer system 100 will still have to expend processing resources to monitor the continuous stream of broadcast messages from the malfunctioning node.

In a third embodiment, computer system 100 may simply drop a malfunctioning node from the emulated LAN entirely. Again, this is preferably done in addition to the generation of a warning message. Thus, if node 204 exceeds the predetermined threshold rate, computer system 100 generates a warning message and causes connection 240 to be broken. Any subsequent broadcast by any of the remaining nodes in the emulated LAN would only be retransmitted to the remaining nodes, and not to node 204. Further, computer system 100 would prevent the malfunctioning node from rejoining the emulated LAN for a predetermined black-out period.

This embodiment has the advantage that computer system 100 would not have to expend processing resources to continuously monitor messages from the malfunctioning node. However, this embodiment has a disadvantage that computer system 100 will not automatically detect if node 204 ceases to malfunction, because the breaking of connection 240 prevents computer system 100 from receiving any message from node 204. Hence, computer system 100 is prevented from computing the broadcast rate from node 204. Consequently, computer system 100 cannot immediately rejoin node 204 to the emulated LAN as soon as the broadcast storm condition has disappeared.

Computer system 100 will allow node 204 to rejoin the emulated LAN either after a black-out period expires, or by manual intervention by an operator, whichever occurs first. A black-out period indicates the amount of time during which a particular node that exceeded the broadcast threshold in a previous monitoring period is not allowed to rejoin the emulated LAN.

The manual intervention, for example an operation at a Network Management Workstation, will cause a message to be sent to computer system 100, indicating that node 204 should be allowed to rejoin the emulated LAN. This manual intervention will occur presumably after the conditions that caused node 204 to generate a broadcast storm have been remedied.

While three error-handling policies have been described above as a separate embodiments, they may also be combined in a single embodiment. For example, in addition to count value table 216, memory 104 may also store a broadcast storm policy value for each of the nodes in the emulated LAN. The broadcast storm policy value for a given node would indicate which of the error-handling procedures should be performed when that particular node exceeds the maximum allowed broadcast rate. These policy values may indicate, for example, that warning messages should be sent for malfunctions in nodes 204, 210 and 212, but that nodes 206 and 208 should be completely cut out of the emulated LAN if they malfunction.

In addition, computer system 100 may be configured such that a single maximum threshold value applies to all of the nodes in the emulated LAN, or that each node in the emulated LAN has its own maximum allowed broadcast rate. By allowing each node to have its own maximum allowed broadcast rate, computer system 100 may more accurately distinguish between normal and aberrant behavior. That is, the range of normal broadcast rates for one type of node may be different than the range of normal broadcast rates for a different type of node.

Figure 3:
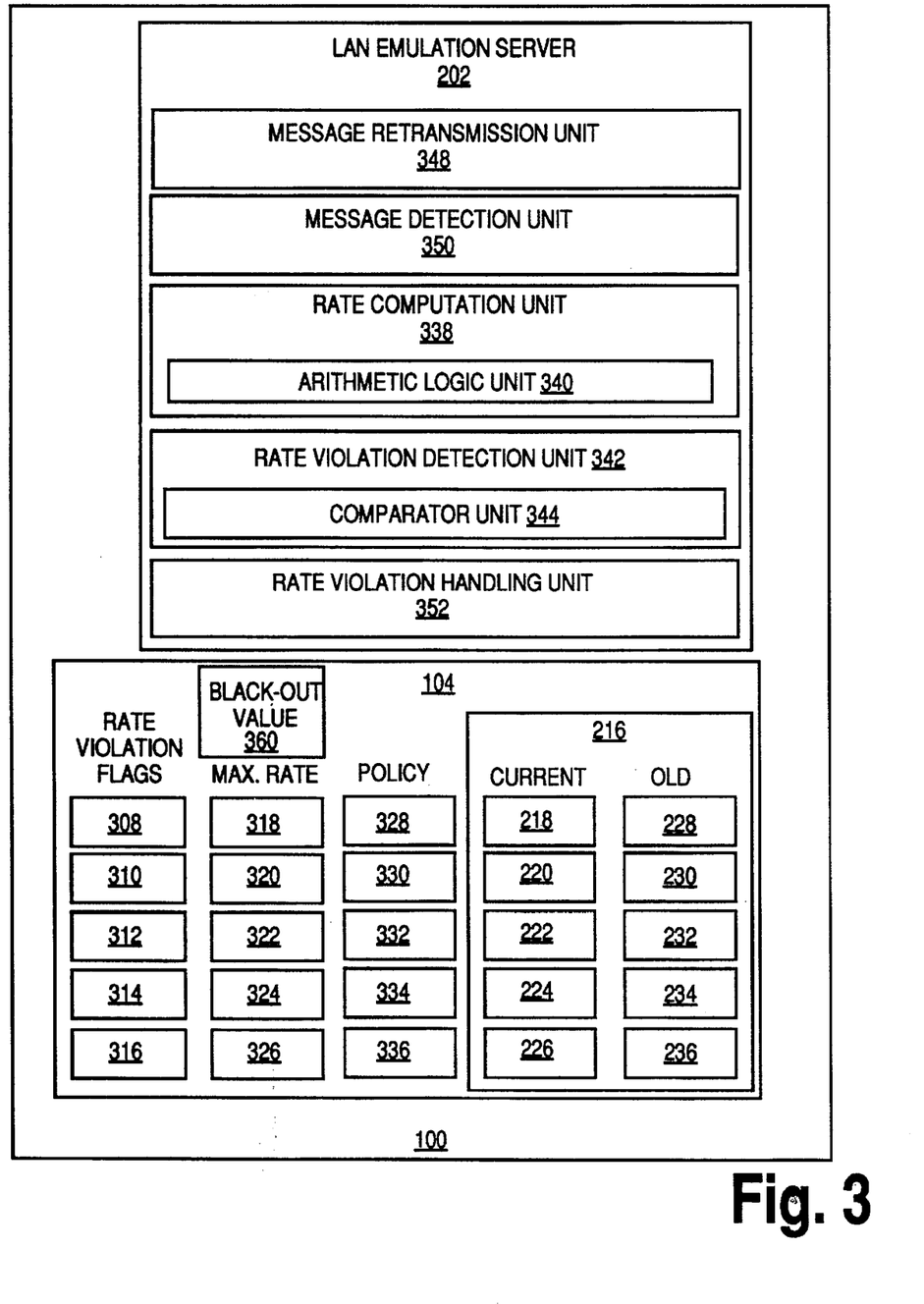
FIG. 3 is a block diagram that illustrates a LAN emulation server configured according to an embodiment of the present invention.

Referring to FIG. 3, it is a functional block diagram that illustrates computer system 100 according to an embodiment of the present invention. In the embodiment shown in FIG. 3, LAN emulation server 202 is located outside of and separate from memory 104 to indicate that LAN emulation server 202 may be implemented with hard-wired circuitry, implemented partially in hardware and partially in software, or, as shown in FIG. 2, implemented entirely in software stored in memory 104.

LAN emulation server 202 includes a message retransmission unit 348, a message detection unit 350, a rate computation unit 338, a rate violation detection unit 342, and a rate violation handling unit 352.

In addition to count value table 216, memory 104 contains a plurality of rate violation flags 308–316, a plurality of rate threshold values 318–326, a plurality of policy values 328–336, and a black-out value 360 for the black-out period. The blackout value 360 applies only in cases where the policy is to remove a node from the emulated LAN. In an alternate embodiment, each node may have an individually specified black-out period rather than a single black-out period that applies to all nodes in the emulated LAN.

Each rate violation flag corresponds to a specific node of the emulated LAN and indicates whether the node exceeded its broadcast rate threshold during the previous monitoring period. Each rate threshold value corresponds to a specific node in the emulated LAN and indicates the maximum allowed broadcast rate for the particular node. Each policy indicator value corresponds to a particular node in the emulated LAN and indicates the rate violation handling process that should be performed when that particular node exceeds its maximum rate threshold. Reference shall now be made to FIGS. 3–6 to describe the operation of LAN emulation server 202.

Figure 4:
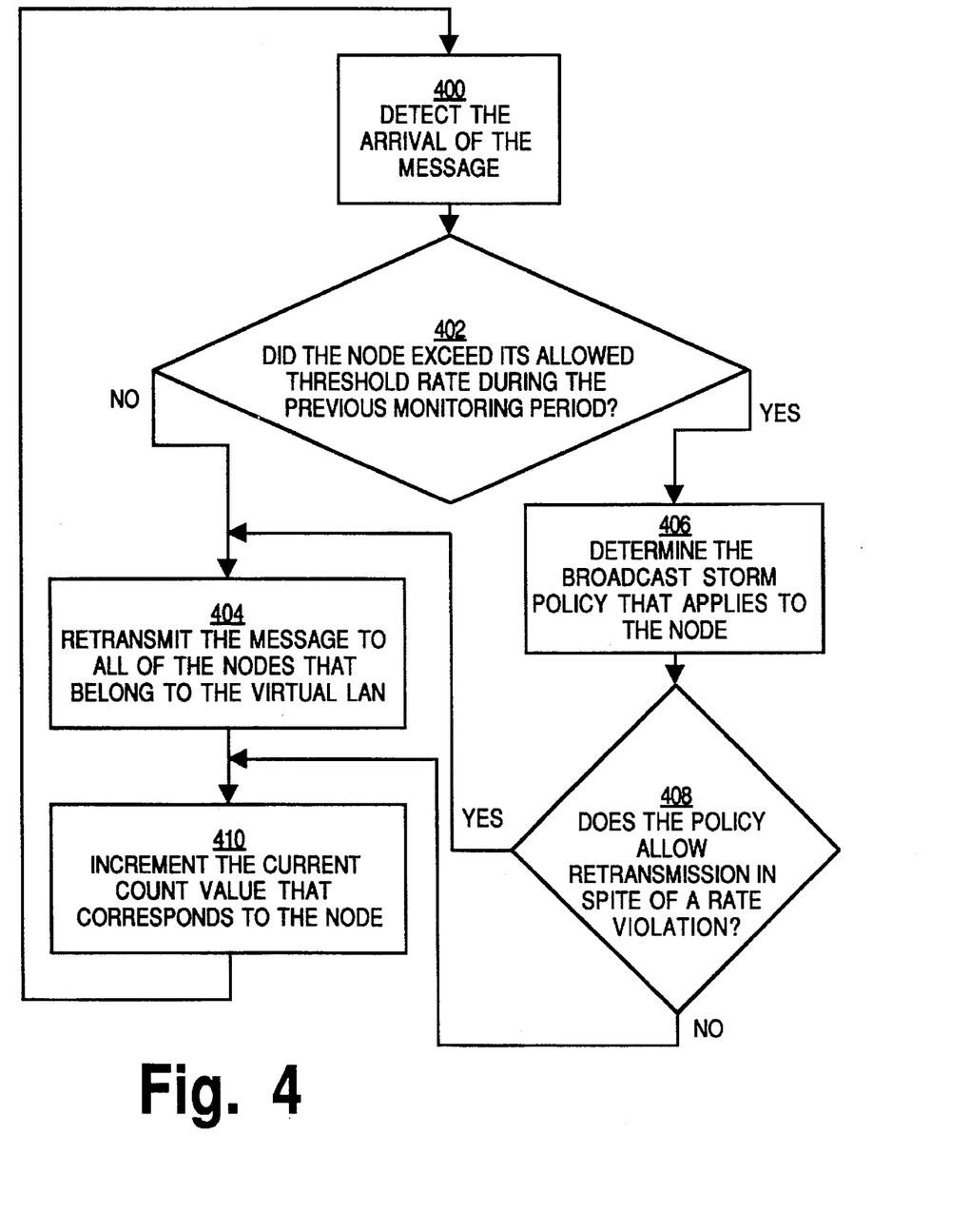
FIG. 4 is a flow chart illustrating the steps performed by a LAN emulation server according to an embodiment of the invention.

When computer system 100 receives a broadcast message from a node in the emulated LAN, the message detection unit 350 detects the arrival of the message (step 400). Message detection unit 350 reads the value of the violation flag stored in memory 104 that corresponds to the node that sent the message to determine whether the node exceeded its allowed threshold rate during the previous monitoring period (step 402). If the violation flag for the node indicates that the node did not exceed its maximum allowed rate, message detection unit 350 invokes message retransmission unit 348. Message retransmission unit 348 then retransmits the message to all of the nodes that belong to the emulated LAN (step 404).

If the violation flag for the node indicates that the node did exceed its maximum allowed threshold rate in the previous monitoring period, message detection unit 350 reads the policy value that corresponds to the node to determine the broadcast storm policy that applies to the node (step 406). The policy value for the node will indicate how messages that follow a rate violation should be treated. As mentioned above, certain policies allow messages to be retransmitted in spite of rate violations (e.g., a policy that merely generates a warning indication). If the policy for the node allows subsequent messages to be retransmitted, then message detection unit 350 invokes message retransmission unit 348 (step 408). As described above, message retransmission unit 348 retransmits the received message to all of the nodes on the emulated LAN. If the policy does not allow subsequent messages to be retransmitted, then the message is not retransmitted.

Message detection unit 350 also generates a signal to rate computation unit 338 to indicate the arrival of a broadcast message from the node that sent the message. Rate computation unit 338 responds to the signal by incrementing the current count value that corresponds to the node (step 410).

Figure 6:
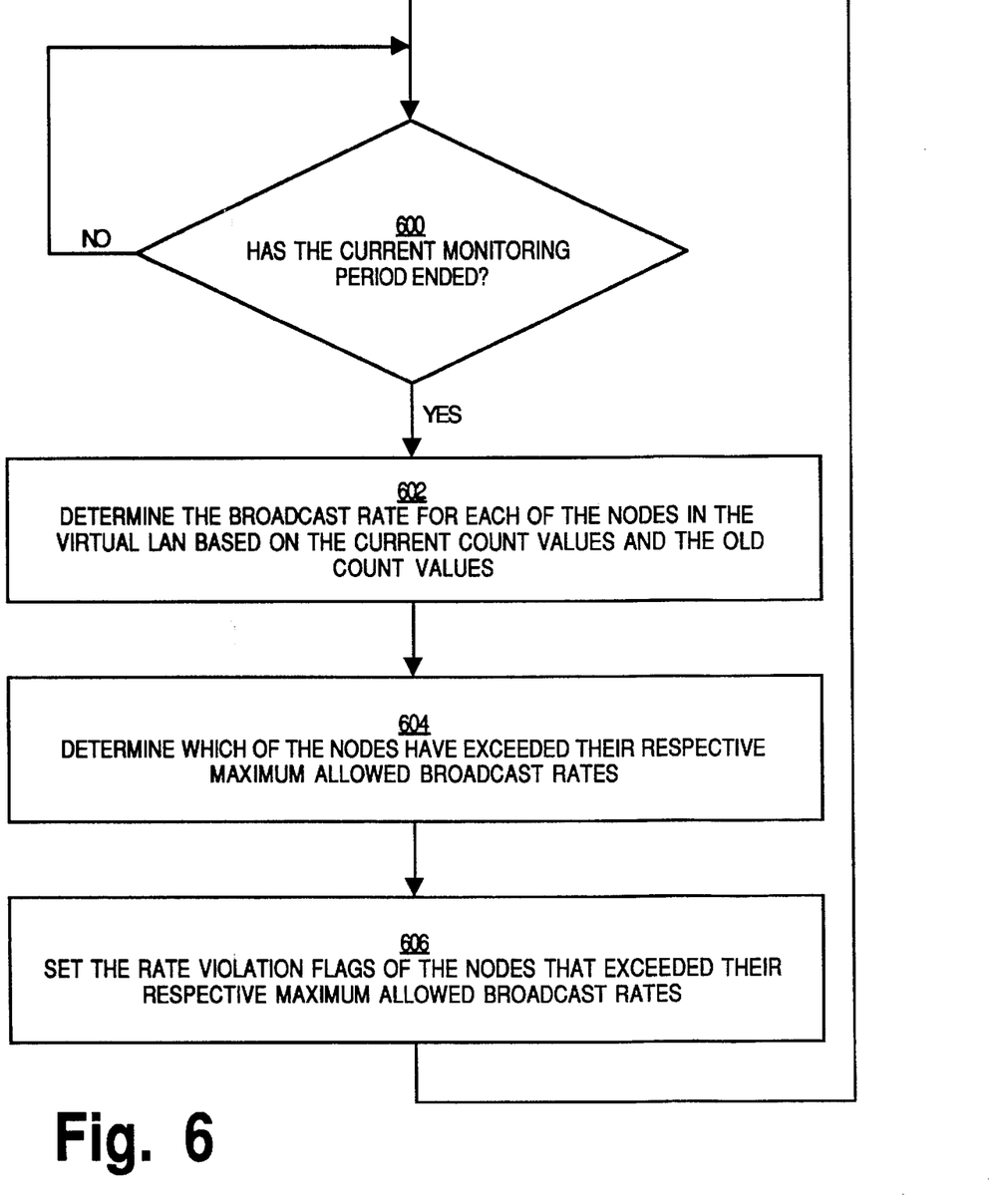
FIG. 6 is a flow chart illustrating steps for flagging broadcast rate violations according to an embodiment of the invention.

Referring to FIG. 6, LAN emulation server 202 determines whether the current monitoring period has ended (step 600). This would typically be determined based on timing signals received by LAN emulation server 202 from a timing service. Specifically, LAN emulation server 202 initially specifies to the timer service the time interval at which these special messages should be sent. The timer service would then send the timer messages to LAN emulation server 202 regularly at the specified time interval.

At the end of each monitoring period, rate computation unit 338 determines the broadcast rate for each of the nodes in the emulated LAN based on the current count values and the old count values (step 602). Specifically, rate computation unit 338 determines the difference between the current count value and the old count value for each of the nodes in the emulated LAN. Rate computation unit 338 divides these differences by the duration of the monitoring period to determine the rate at which each of the nodes broadcast messages during the monitoring period. To perform these calculations, rate computation unit 338 includes or invokes an arithmetic logic unit 340.

Once the broadcast rates for each of the nodes in the emulated LAN have been determined by rate computation unit 338, rate violation detection unit 342 determines which of the nodes have exceeded their respective maximum allowed broadcast rates (step 604). Rate violation detection unit 342 makes this determination by comparing the actual broadcast rate of each node with its maximum allowed rate, as indicated by values 318–326. If a node has exceeded its maximum allowed rate, rate violation detection unit 342 sets the violation flag corresponding to the node (step 606). Conversely, if the actual broadcast rate of a node is below the node's maximum allowed rate, rate violation detection unit 342 clears the violation flag that corresponds to the node (step 420). To perform these comparisons, rate violation detection unit 342 includes a comparator unit 344.

Figure 5:
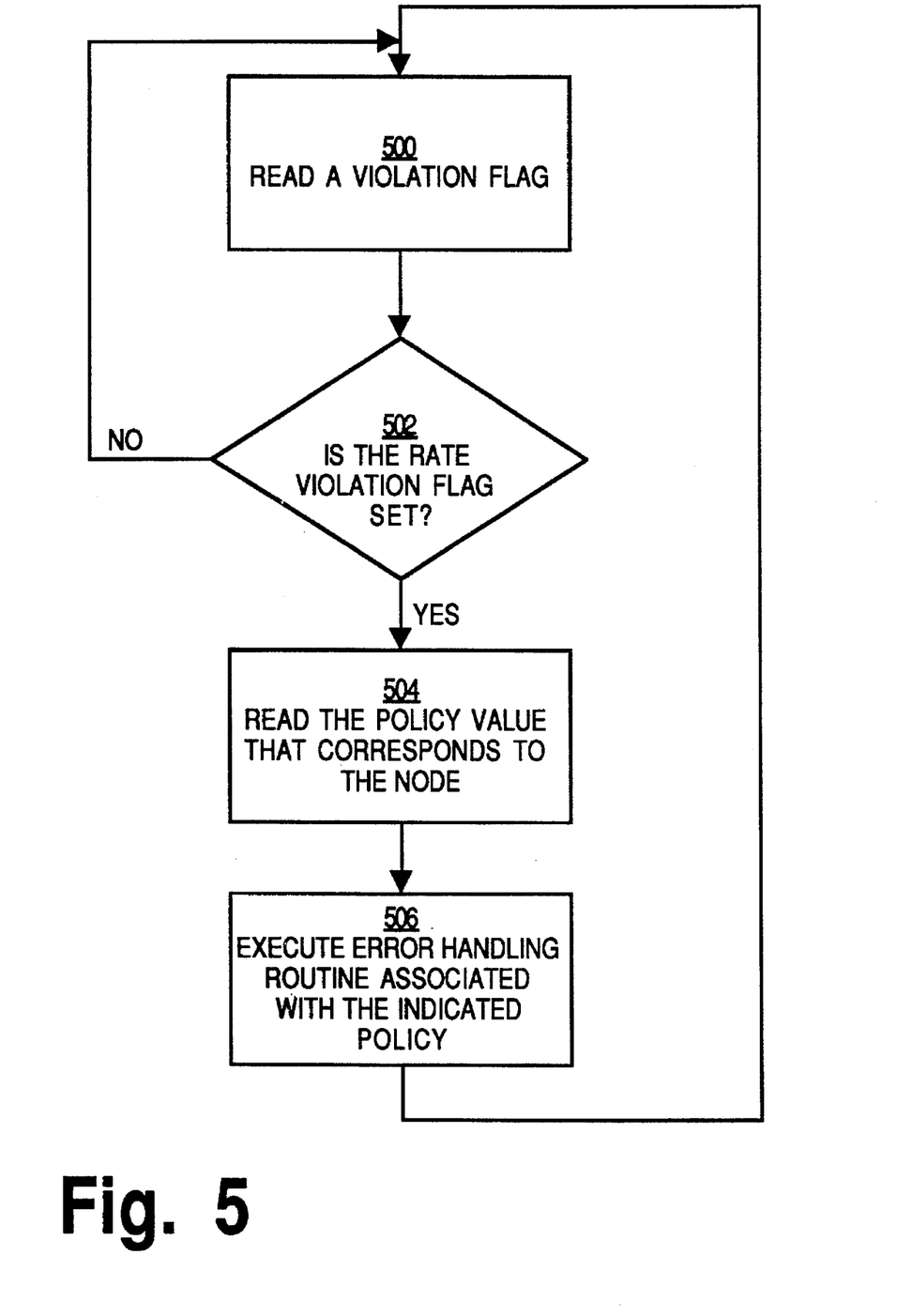
FIG. 5 is a flow chart illustrating the steps performed by a rate violation handling unit according to an embodiment of the invention.

Referring to FIG. 5, it is a flow chart illustrating the operations of rate violation handling unit 352 according to an embodiment of the invention. Rate violation handling unit 352 periodically reads the rate violation flags 308–316 (step 500). When rate violation handling unit 352 encounters a violation flag that indicates that a node has exceeded its maximum allowed broadcast rate (step 502), rate violation handling unit 352 reads the policy value that corresponds to the node (step 504) and executes an error-handling routine that corresponds to the policy indicated by the policy value (step 506). This may involve, for example, the generation of a warning indication.

In the preferred embodiment, rate violation detection unit 342 invokes rate violation handling unit immediately when a rate violation occurs. Consequently, rate violation handling unit 352 reads the policy value of a node that exceeds its maximum allowed broadcast rate (step 504) immediately after rate violation detection unit sets the violation flag corresponding to the node (step 606).

For the purposes of explanation, the operation of LAN emulation server 202 has been described with respect to a single emulated LAN. However, LAN emulation server 202 may be configured to simultaneously service any number of emulated LANs. The present invention is not limited with respect to the number of emulated LANs serviced by LAN emulation server 202, or by the number or type of nodes in each of the emulated LANs.

Further, LAN emulation server 202 may be configured to have a single maximum allowed broadcast rate applied to all the nodes in all of the emulated LANs, to have a different maximum rate for each of the emulated LANs, or to have a different maximum rate for each of the nodes in each of the LANs. Similarly, a single policy may apply to all of the nodes in all the emulated LANs, each LAN may have its own policy, or each node in each LAN may have its own policy. Further, a single blackout period may apply to multiple emulated LANs, each emulated LAN may have its own black-out period, or each node in each emulated LAN may have its own blackout period.

In the preferred embodiment, LAN emulation server 202 includes a configuration mechanism that allows a human operator to specify the various values used by LAN emulation server 202. For example, a user may specify the policy values for a group of emulated LANs, a single emulated LAN, or each device in an emulated LAN. A user may also specify the maximum allowed broadcast rate for a group of emulated LANs, a single emulated LAN, or each device in an emulated LAN. A user may also specify the duration of the black-out period for a group of emulated LANs, a single emulated LAN, or each device in an emulated LAN. The configuration mechanism allows the operator to change any of these values dynamically, while LAN emulation server 202 is operating.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. A method for detecting broadcast storms in an emulated Local Area Network, the method comprising the steps of:

determining a plurality of broadcast rates for a plurality of nodes in the emulated Local Area Network, wherein said plurality of broadcast rates are the broadcast rates of said plurality of nodes during a monitoring period;

comparing each of said plurality of broadcast rates with a maximum allowed broadcast rate;

determining that a broadcast storm is occurring if any of said plurality of broadcast rates exceeds the maximum allowed broadcast rate with which it is compared.

2. The method of claim 1 wherein said step of determining said plurality of broadcast rates comprises performing the following steps for each node in said emulated Local Area Network:

prior to said monitoring period, establishing equality between a current count value that corresponds to the node and an old count value that corresponds to the node;

during said monitoring period, incrementing said current count value for each broadcast message sent by the node; and after said monitoring period, determining the difference between the current count value and the old count value.

3. The method of claim 2 wherein said step of determining said plurality of broadcast rates comprises performing the following steps for each node in said emulated Local Area Network:

dividing the difference between the current count value and the old count value by a value that reflects the duration of the monitoring period.

4. The method of claim 1 wherein the step of comparing each of said plurality of broadcast rates with a maximum allowed broadcast rate comprises:

comparing each of said plurality of broadcast rates with the same maximum allowed broadcast rate.

5. The method of claim 1 wherein the step of comparing each of said plurality of broadcast rates with a maximum allowed broadcast rate comprises:

storing a plurality of maximum allowed broadcast rates, wherein each of said nodes in said emulated Local Area Network has a corresponding maximum allowed broadcast rate in said plurality of maximum allowed broadcast rates;

comparing the broadcast rate of each node with the corresponding maximum allowed broadcast rate of the node.

6. The method of claim 1 further comprising performing the following steps upon determining that a broadcast storm is occurring:

determining a policy that applies to the node that is causing said broadcast storm; and executing countermeasures specified in said policy.

7. The method of claim 6 wherein said step of determining a policy that applies to the node that is causing said broadcast storm comprises the step of:

storing a plurality of policy values, wherein each of said plurality of policy values indicates a policy for a corresponding node of said emulated Local Area Network;

determining which node of said emulated Local Area Network is causing said broadcast storm; and reading the policy value that corresponds to the node that is causing said broadcast storm.

8. The method of claim 6 wherein said step of executing countermeasures comprises the step of:

removing the node that is causing said broadcast storm from said emulated Local Area Network.

9. The method of claim 8 wherein said step of executing countermeasures further comprises the step of:

preventing the node that is causing said broadcast storm from rejoining said emulated Local Area Network for a predetermined period of time.

10. The method of claim 6 wherein said step of executing countermeasures comprises the steps of:

generating a warning indication to indicate that a broadcast storm is occurring; and continuing to monitor and retransmit messages from the node that is causing said broadcast storm during a subsequent monitoring period.

11. The method of claim 6 wherein said step of executing countermeasures comprises the step of:

continuing to monitor but not retransmitting messages from the node that is causing said broadcast storm during a subsequent monitoring period.

12. The method of claim 11 further comprising the steps of:

determining the rate at which the node that is causing said broadcast storm is sending messages during said subsequent monitoring period; and retransmitting messages received from the node that is causing said broadcast storm if the rate at which the node sent messages during the subsequent monitoring period does not exceed the maximum allowed broadcast rate.

13. The method of claim 1 wherein said step of determining said plurality of broadcast rates comprises determining the quantity of broadcast messages sent by each node of the plurality of nodes during the monitoring period.

14. The method of claim 1 wherein said step of determining said plurality of broadcast rates comprises determining the quantity of information contained in the broadcast messages that are sent by each node of the plurality of nodes during the monitoring period.

15. A LAN emulation server for use in a computer system, the LAN emulation server comprising:

a message detection unit for detecting the arrival of messages from any of a plurality of nodes that belong to an emulated Local Area Network;

a message retransmission unit for retransmitting to all of said plurality of nodes the messages received from any of said plurality of nodes;

a rate computation unit for determining a plurality of broadcast rates of the plurality of nodes during a monitoring period;

a rate violation detection unit for determining when any of the broadcast rates exceeds a maximum allowed broadcast rate; and a rate violation handling unit for executing countermeasures in response to detecting that any of the rates exceeds said maximum allowed broadcast rate.

16. The LAN emulation server of claim 15 further including a memory that stores a count value table, wherein:

the count value table stores a current count value and an old count value for each of said plurality of nodes;

said message detection unit increments said current count value for a node upon detection of a message from the node;

said rate computation unit determines said rates based on the difference between said current count value and said old count value for each node.

17. The LAN emulation server of claim 15 further comprising a memory that stores a plurality of rate violation flags, wherein:

each node of said plurality of nodes has a corresponding rate violation flag of said plurality of rate violation flags;

said rate violation detection unit sets the rate violation flag that corresponds to any node that exceeds the maximum allowed broadcast rate during the monitoring period.

18. The LAN emulation server of claim 17 wherein:

said memory stores a plurality of policy flags, wherein said plurality of policy flags includes a policy flag that corresponds to each of said plurality of nodes;

said message retransmission unit does not retransmit any messages received from a node if the rate violation flag of the node is set; and the policy flag that corresponds to the node indicates a policy in which messages from a node that exceeds the maximum allowed broadcast rate are not retransmitted.

19. The LAN emulation server of claim 17 wherein said message retransmission unit does not retransmit messages from any node when the rate violation flag that corresponds to the node is set.

20. The LAN emulation server of claim 17 wherein said rate violation detection unit clears the rate violation flag of a node if the node does not exceed the maximum allowed broadcast rate during a subsequent monitoring period.

21. The LAN emulation server of claim 15 wherein said countermeasures include removing any node that exceeds said maximum allowed broadcast rate from said emulated Local Area Network.

22. The LAN emulation server of claim 21 wherein said countermeasures include preventing a node that exceeds said maximum allowed broadcast rate from rejoining said emulated Local Area Network for a predetermined period of time.

23. The LAN emulation server of claim 22 further including a configuration mechanism that allows a human operator to specify said predetermined period of time.

24. The LAN emulation server of claim 22 further including a manual reset mechanism through which a human operator may cause the LAN emulation server to allow the node that exceeds said maximum allowed broadcast rate to rejoin the emulated Local Area Network prior to completion of said predetermined period of time.

25. The LAN emulation server of claim 15 wherein said countermeasures include generating a warning indication.

26. The LAN emulation server of claim 15 further including a configuration mechanism that allows a human operator to specify said maximum allowed broadcast rate.

27. The LAN emulation server of claim 26 wherein said configuration mechanism allows the human operator to specify said maximum allowed broadcast rate while said LAN emulation server is operating.

28. The LAN emulation server of claim 15 wherein said countermeasures include removing any node that exceeds said maximum allowed broadcast rate from said emulated Local Area Network.

29. The LAN emulation server of claim 15 wherein the rate violation handling unit selects said countermeasures based on a policy flag, wherein said LAN emulation server includes a configuration mechanism that allows a human operator to specify a value for said policy flag.

* * * * *